H. WEINER.
TIRE CHAIN.
APPLICATION FILED SEPT. 11, 1915.
1,264,463.
Patented Apr. 30, 1918.
2 SHEETS—SHEET 1.
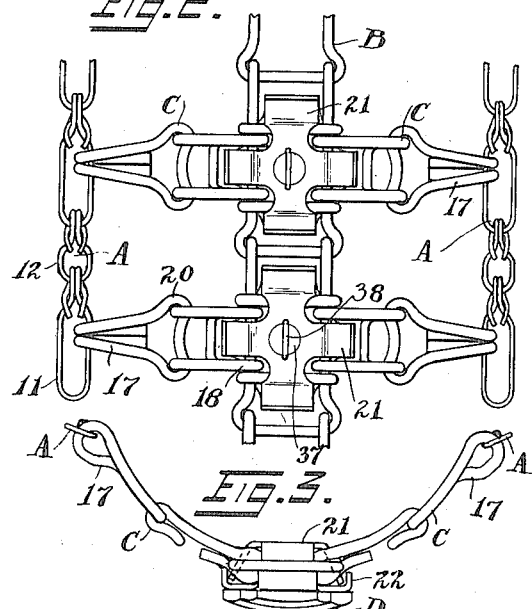
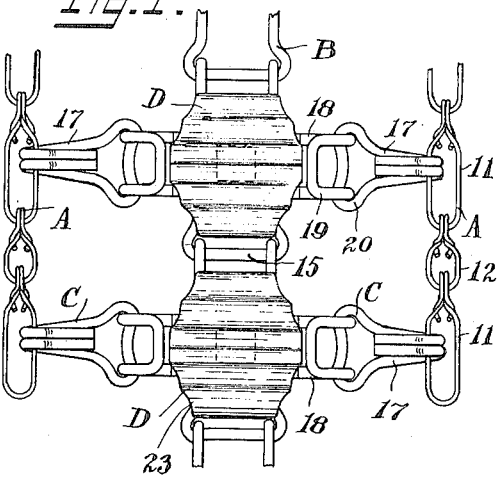
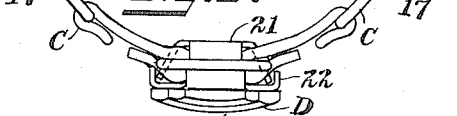
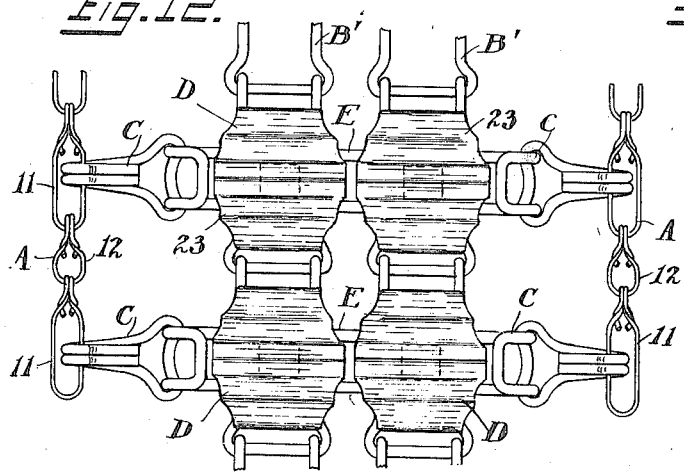
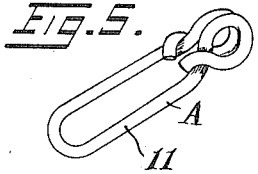
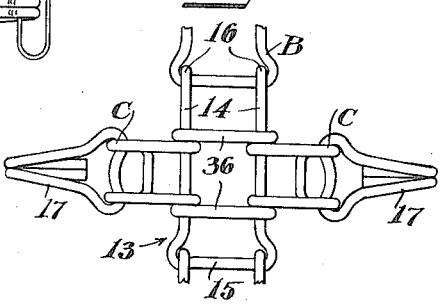
Witnesses:
Charles Horton
H. D. Penney
Inventor:
Harris Weiner,
By his Att'y: F. H. Richard H. WEINER.
TIRE CHAIN.
APPLICATION FILED SEPT. 11, 1915.
1,264,463.
Patented Apr. 30, 1918.
2 SHEETS—SHEET 2.
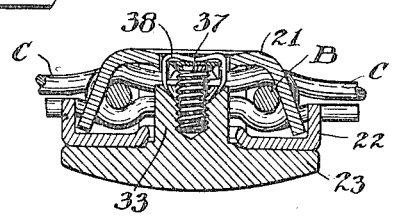
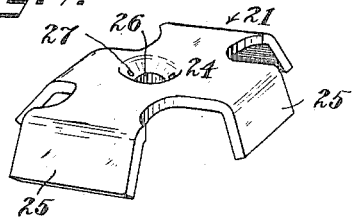
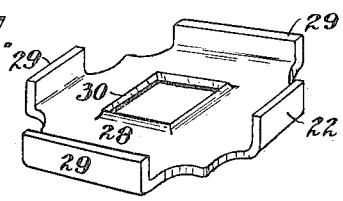
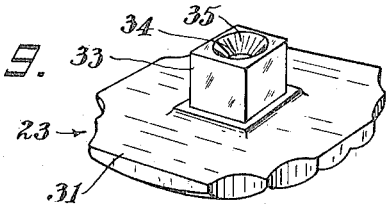
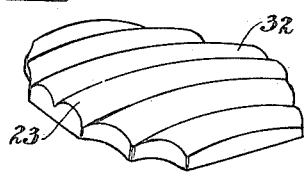
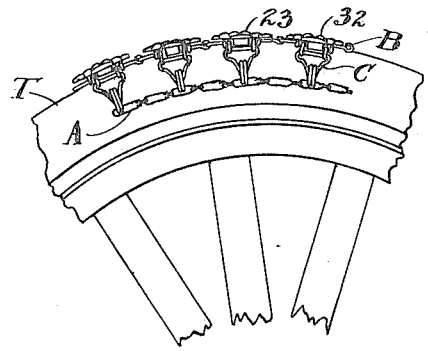
Witnesses:
Charles Horton
H. D. Penney
Inventor:
Harris Weiner,
By his Atty: F. H. Richards

UNITED STATES PATENT OFFICE.

HARRIS WEINER, OF NEW YORK, N. Y., ASSIGNOR OF ONE-FOURTH TO ELIZA B. WEBER, OF NEW YORK, N. Y.

TIRE-CHAIN.

1,264,463. Specification of Letters Patent. Patented Apr. 30, 1918.

Application filed September 11, 1915. Serial No. 50,144.

*To all whom it may concern:*

Be it known that I, HARRIS WEINER, a subject of the Czar of Russia, residing in New York, N. Y., have invented certain new and useful Improvements in Tire-Chains, of which the following is a specification.

This invention relates to improvements in tire chains and has for a main object to provide a tire chain in which the parts subjected to the greatest wear, that is the part coming in contact with the roadbed, can be quickly or cheaply replaced without incurring the expense of replacing the entire chain.

Still another object of the invention is to provide a chain equipped with replaceable tread members of such character in which the destruction of the same will not in any way impair the continuity of the tire chain so that even when tread members that have been destroyed or injured, are not immediately replaced, the efficiency of the chain will not be materially impaired.

A still further object of the invention is to provide such a replaceable tread member for a tire which tread member can be quickly anchored in place and yet preserve the flexibility of the chain proper and also form a flexible connection with the chain proper.

These and other features, capabilities and advantages of the invention will appear from the subjoined detail description of specific embodiments thereof illustrated in the accompanying drawings in which—

Figure 1 is a top plan view of a portion of the completed tire chain.

Fig. 2 is a bottom plan view of the same.

Fig. 3 is an end view of one section of the chain illustrated in Fig. 1.

Fig. 4 is a plan view of a portion of the transversely extending members of the chain with the tread member removed therefrom.

Fig. 5 is a perspective of one of the side links connecting together the ends of the transversely extending members of the chain.

Fig. 6, is a view in central axial cross-section of one of the tread-members in position in the chain supported tread-retaining-supporting mechanism.

Fig. 7 is a perspective view of the inner locking plate of the tread member.

Fig. 8 is a perspective view of the outer locking plate of such tread member.

Fig. 9 is a perspective view of the replaceable tread member looking at the inner side of the same; and Fig. 10 is a perspective of such replaceable tread member looking at the outer or roadbed engaging side of the same.

Fig. 10 is a view in perspective of one of the ribbed tread-members removed, showing the longitudinal corrugations or rib structures which contact with the road-bed.

Fig. 11 is a fragmental view of a wheel equipped with the tire chain illustrated in Fig. 1.

Fig. 12 is a plan view showing the outer surface of another form of tire chain in which there are two rows of tread members instead of one as shown in Fig. 1.

In the embodiment shown in Figs. 1 and 2, there is provided a chain having annular side members A to be disposed on each side of a tire T (Fig. 11) of a wheel. Intermediate these side members A and along the line of the roadbed engaging surface, there is provided an annular member B which is connected to the side members A by the transverse members C. The transverse members C are preferably arranged in pairs so that there will be provided a plurality of locations along the intermediate annular member B on opposite sides of each of which two locations two transverse members C are attached. At each of these locations along the intermediate annular member B, there is provided a replaceable tread member D.

Each of the side members A is composed of a plurality of long links 11 connected to one another by short links 12.

The intermediate annular member B is composed of a plurality of links 13 each having two side bars 14 each bent outwardly at one end and extending into a cross bar 15 connecting the two side bars 14 to one another. The other ends of the side bars 14 are formed into hook portions 16 to engage the cross bar 15 of an adjacent link.

The transverse members C are each composed of an eyelet link member 17 and a hook link member 18. The eyelet link members 17 are attached to the long links 11 of the side members A and the hook link members 18 are attached to the side bars 14 of the intermediate annular member B, the arrangement being such that there are two transverse members C attached to each link 13 of the intermediate annular member B, one transverse member C being attached to one side bar of such link 13 and at its other end connected with one side member A, and the other transverse member to the other side bar 14 of such link 13 and extending in the opposite direction to connect with the other side member A. The hook members 18 when arranged on the tire T of a wheel preferably have their hook portions 19 free to be engaged by the base-loops 20 of the eyelet-link members 17.

The tread members D are each composed of an inner locking plate 21, an outer locking plate 22, and a roadbed engaging member 23 which latter incidentally is the replaceable tread portion. The inner locking plate 21 has a base portion 24 at an angle to the plane of which extend arms 25 and substantially in the center of which base member 24 there is provided a screw opening 26 having on opposite sides thereof, in such base member 24 orifices 27. The outer locking plate 22 is of similar construction having a base member 28, at an angle to the plane of which extend arms 29, and substantially in the center of which base member 28 there is provided a quadrilateral opening 30, the edges of which are slightly struck up from the plane of the base member 28 and extend in the same direction as the arms 29. Each roadbed engaging member 23 is composed of a base member 31 substantially flat faced on one side thereof and on its other side which is the roadbed engaging side it is provided with a plurality of arcuate in cross-section fluted conformations 32 extending parallel with one another; the base-member being thicker along the longitudinal center than at the edges so that the outer ribbed surface contacting with the road will be transversely curved. Disposed substantially in the center of the base member 31 and extending from the plane side thereof, there is provided an angular boss 33 preferably quadrilateral as shown which boss 33 is provided with an internally screw-threaded opening 34 having at its upper end a concave socket portion 35.

For locking the hook members 18 in position on the side bars 14, one hook member 18 opposite another one, there are provided substantially rigidly secured locking links 36 for each link 13 between which two links 36 on a link 13 the hook members are disposed and thus locked in place.

When securing the roadbed engaging members D to the intermediate member B and transverse members C, two of the oppositely extending arms 25 of each locking plate 21 are disposed on opposite sides of a link 13 and between the side bars of the hook members 18, while the other arms 25 are disposed between the bars 14 with the links 36 between them. Thereupon the outer locking plate 22 is disposed on the other side of such link 13 and its arms 29, there being four in number the same as the number of arms 25 of the inner plate and which are spread farther apart than the arms 25, are disposed to extend about the arms 25 as shown in Fig. 6. The boss 33 of the roadbed engaging member 23 is passed through the opening 30 of the outer locking plate 22 being prevented from rotation in such outer locking plate 22 by the angular conformation of the opening 30 and of the boss 33, this roadbed engaging member being so disposed on the outer locking plate 22 that its flutes 32 will extend transversely of the tire T (see Fig. 11). The roadbed engaging member 23 is thereupon secured in place by means of a screw 37 passed in through the opening 26 of the inner plate into the boss 33 of the roadbed engaging member. For locking the screw 37 against movement, a staple 38 is provided which has its points passed through the orifices 27 of the inner locking plate 21 and when driven home has its body member extended through the slot of the screw 37, while its ends in their final position are bent inward by means of the concave surface of the socket 35 so that they will assume the position shown in Fig. 6.

In the modification shown in Fig. 12 the side members A and the transverse members C are substantially identical with the construction shown in Fig. 1, the only difference is that instead of one intermediate annular member B there are provided two intermediate annular members B' linked to one another by links E and each of these intermediate annular members B' are provided with roadbed engaging members 23 which are identical to the roadbed engaging members 23 of the construction shown in Fig. 1.

It is obvious that various changes and modifications may be made to the details of construction without departing from the general spirit of the invention.

I claim:

1. In a tire chain, an intermediate member comprising links each having an end bar and long side members; a pair of hooked rods spaced from each other and connecting together the side members; transverse members each having separated hooked ends engaging over said side members adjacent to said rods; locking means engaging between said side members and between said hooked ends and between said rods, and embracing said rods, said hooked ends and said side members; road engaging members; and means for locking said plates and road engaging members together;

2. In a tire chain, an intermediate member comprising links each having an end bar and long side members; a pair of hooked rods spaced from each other and connecting together the side members; transverse members each having separated hooked ends engaging over said side members adjacent to said rods; locking means embracing and holding in spaced relation said rods, said hooked ends and said side members; road engaging members; and means for locking said plates and road engaging members together.

3. In a tire chain, an intermediate member comprising links each having an end bar and long side members; a pair of hooked rods spaced from each other and connecting together the side members; transverse members each having separated hooked ends engaging over said side members adjacent to said rods; interengaging cross-shaped locking plates each comprising longitudinal and transverse arms, the transverse arms engaging between the hooked rods and said hooked ends and embracing said side members, the longitudinal arms engaging between the side members and embracing the rods and said hooked ends; road engaging members; and means locking said plates and the road engaging members together.

4. In a tire chain, an intermediate member comprising bent wire links each having long side members, a cross bar at one end, and a pair of hooked ends engaging over the cross bar of the adjacent link; transverse members each comprising hooks engaging said side member at two points; a pair of hooked rods connecting the side members of each link; interengaging cross-shaped plates provided with central openings and each comprising side arms engaging between said hooks and rods, and end arms engaging over said rods; road engaging members each provided with a lug adapted to pass through one of said openings; and a screw passing through the other opening and engaging in said lug.

5. In a tire chain, an intermediate member comprising bent wire links each having long side members, a cross bar at one end, and a pair of hooked ends engaging over the cross bar of the adjacent link; transverse members each comprising hooks engaging said side member at two points; a pair of hooked rods connecting the side members of each link; interengaging cross-shaped locking plates each provided with a central opening and each comprising side arms engaging between said hooks and rods, and end arms engaging over said rods; road engaging members each provided with a lug adapted to pass through one of said openings; a screw passing through the other opening and engaging in said lug; and means for locking said screw in place.

6. A tire chain having side members, a support comprising a plurality of connected links, transverse members securing said links to said side members, said connected links each having two side bars, two locking links locking said transverse members between them on said connected links, replaceable tread members secured to said connected links, said tread members each comprising locking plates extending around said locking links and connected links, a roadbed engaging member, and means for securing said roadbed engaging member to said locking plates.

HARRIS WEINER.

Witnesses:
H. I. SIEGEL,
H. D. PENNEY.